United States Patent [19]

Hosaka et al.

[11] 4,367,264
[45] Jan. 4, 1983

[54] MAGNETIC RECORDING MEDIUM

[75] Inventors: Akihiko Hosaka; Yukihiro Isobe; Kiyotaka Okuyama, all of Tokyo, Japan

[73] Assignee: TDK Electronics Co., Ltd., Tokyo, Japan

[21] Appl. No.: 283,101

[22] Filed: Jul. 13, 1981

[30] Foreign Application Priority Data

Aug. 30, 1980 [JP] Japan .................................. 55-120558

[51] Int. Cl.³ .............................................. G11B 5/70
[52] U.S. Cl. ................................ 428/413; 252/62.54; 360/134; 428/425.9; 428/694; 428/900
[58] Field of Search ............... 428/692, 694, 695, 900, 428/480, 413, 425.9; 427/128, 127; 252/62.54, 62.53; 360/134, 135, 136

[56] References Cited

U.S. PATENT DOCUMENTS 4,115,290 9/1978 Kubota et al. .................... 252/62.54
4,238,548 12/1980 Okuyama et al. .................... 428/480
4,323,628 4/1982 Okuyama et al. ................ 428/425.9

FOREIGN PATENT DOCUMENTS 54-97403 8/1979 Japan ................................ 252/62.54
54-29085 9/1979 Japan .................................. 427/128

Primary Examiner—Stanley S. Silverman
Attorney, Agent, or Firm—Oblon, Fisher, Spivak, McClelland & Maier

[57] ABSTRACT

A magnetic recording medium has a substrate coated with a magnetic powder and a binder. The binder in said magnetic layer essentially consists of 15 to 45 wt. % of a polyester resin, 20 to 50 wt. % of an epoxy resin and 10 to 40 wt. % of nitrocellulose.

5 Claims, 1 Drawing Figure

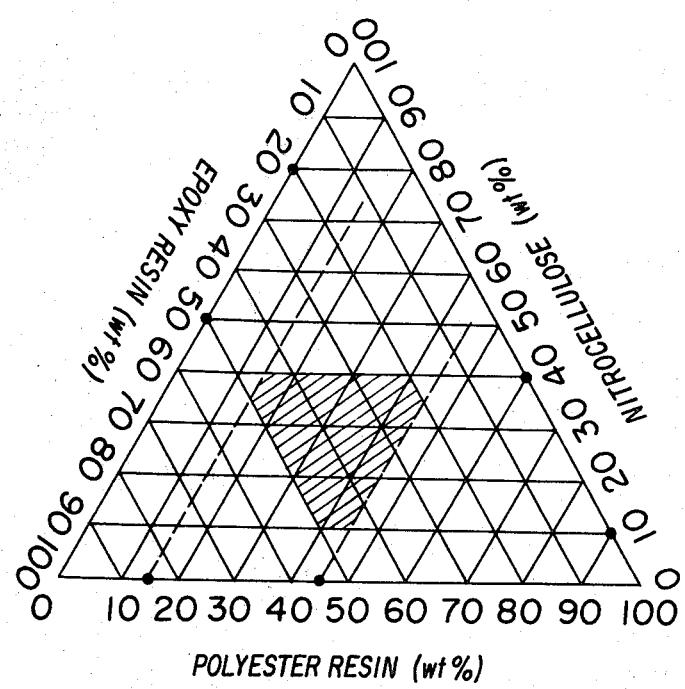

MAGNETIC RECORDING MEDIUM

BACKGROUND OF THE INVENTION

1. Field of the Invention:

The present invention relates to a magnetic recording medium which is prepared by forming a magnetic layer on a substrate by coating a magnetic powder composition comprising a magnetic powder and a binder as main components.

2. Description of the Prior Art:

In general, it has been known that a kind of a binder used for bonding a magnetic powder on a substrate in such magnetic recording media highly affects to an electromagnetic transfer characteristic and physical characteristics such as repeat running durability and adhesive strength.

Heretofore, two component type binders comprising two kinds of resins such as urethane type resins, vinyl chloride-vinyl acetate type resins, cellulose type resins, phenoxy type resins, epoxy type resins and ester type resins have been mainly used as the binder. The combinations of polyurethane and nitrocellulose or the combinations of polyurethane and vinyl chloride-vinyl acetate copolymer have been mainly employed. However, the two component type binders have not attained satisfactory electromagnetic transfer characteristic and physical characteristics such as repeat running durability and adhesive strength. Even though the ratio of the two components is varied, the tendency of the electromagnetic transfer characteristic is inconsistent with that of the physical characteristics. It has been difficult to obtain a magnetic recording medium having satisfactory characteristics.

SUMMARY OF THE INVENTION

It is an object of the present invention to provide a magnetic recording medium which has both of satisfactory electromagnetic transfer characteristic and satisfactory physical characteristics such as repeat running durability and adhesive strength.

The foregoing and other objects of the present invention have been attained by providing a magnetic recording medium comprising a substrate coated with a magnetic layer comprising a magnetic powder and a three component type binder which is essentially consisting of 15 to 45 wt. % of a polyester resin, 20 to 50 wt. % of an epoxy resin and 10 to 40 wt. % of nitrocellulose.

BRIEF DESCRIPTION OF THE DRAWINGS

The FIGURE is a triangular coordinate of three components used as binder for a magnetic layer of a magnetic recording medium of the present invention.

DETAILED DESCRIPTION OF THE PREFERRED EMBODIMENTS

It has been found that magnetic recording media having satisfactory electromagnetic transfer characteristic and also physical characteristics can be obtained by using a three component type binder comprising a polyester resin, an epoxy resin and nitrocellulose in synergistic effect thereof. It has been confirmed that satisfactory results can be given by selecting them in the ranges of 15 to 45 wt. % of a polyester resin, 20 to 50 wt. % of an epoxy resin and 10 to 40 wt. % of nitrocellulose.

The magnetic recording medium of the present invention will be further illustrated.

The magnetic recording medium of the present invention is prepared by coating a magnetic powder composition comprising a magnetic powder such as $\gamma$-$Fe_2O_3$ and Co-adsorbed $\gamma$-$Fe_2O_3$ and a binder as the main components on a substrate such as polyester film to form a magnetic layer.

The binder is the combination of the three components of the polyester resin, the epoxy resin and the nitrocellulose.

The polyester resin can be commercially available polyester resins as a binder such as Nippolan 1004 and 2006 (Nippon Polyurethane Co.); Desmophene 800 and 1100 (Bayer AG); Bairon 53S (Toyo Boseki Co.). Saturated or unsaturated linear polyesters for a binder are preferably used and are described in Encyclopedia of Polymer Science and Technology. The properties of the typical polyester resins are shown in Table.

TABLE

| Polyester | OH value | Acid value | Solid (%) | Viscosity (cps/75° C.) |
|---|---|---|---|---|
| Desmophen 800 | 280–300 | <4 | 100 | 2200–3800 |
| Desmophen 800-75E | 207–228 | <3 | 74–76 | H ~ P (Gardner) |
| Desmophen 1100 | 205–211 | <4 | 100 | 550–750 |
| Desmophen 1100-75E | 150–170 | <3 | 74–76 | D ~ H (Gardner) |
| Desmophen 2200 | 57–64 | <2 | 100 | 925–1075 |
| Nippolan 1004 | 37–45 | <2 | 100 | 600–900 |
| Nippolan 2006 | 375–425 | <10 | 100 | 7000–17000 |
| Nippolan 3023 | 158–176 | <4 | 100 | 350–550 |

| Polyester resin | Intrinsic viscosity | Molecular weight | Melting point (°C.) |
|---|---|---|---|
| Bairon 200 | 0.53 | 15000–20000 | 180–200 |
| Bairon 300 (Interplasticized) | 0.68 | 15000–20000 | 140–160 |

The epoxy resin can be commercially available epoxy resins as a binder such as Epicoat 1001, 1004 and 1009 (Shell Chem. Co. Ltd.). The epoxy resins are condensed products obtained by condensing an epoxy compound with a compound having a reactive hydrogen atom and are described in Encyclopedia of Polymer Science and Technology. The typical epoxy resins include bisphenol type epoxy resins such as methyl epichlorohydrin+bisphenol A, ether ester type epoxy resins such as epichlorohydrin+bisphenol A+dicarboxylic acid; ester type epoxy resins such as methyl epichlorohydrin+polycarboxylic acid; novolack type epoxy resins such as methyl epichlorohydrin+novolack; and non-flammable type epoxy resin such as methyl epichlorohydrin+brominated bisphenol A.

The nitrocellulose can be commercially available nitrocellulose such as H-$\frac{1}{2}$ (Asahi Kasei Co.) and H-$\frac{1}{2}$ (Daicel Co.). The nitrocellulose has been often used in view of excellent wettability to a magnetic powder and excellent leveling in a preparation of a magnetic powder composition. Thus, the nitrocellulose has disadvantage of easy firing and accordingly, it is usual to incorporate isopropyl alcohol (IPA) or dibutylphthalate (DBP) in nitrocellulose. Thus, when isopropyl alcohol is incorporated, it easily reacts with isocyanate group of a polyisocyanate for crosslinking nitrocellulose whereby the crosslinking property is inferior. It is necessary to incorporate excess of the urethane compound. When dibutylphthalate is incorporated, the plasticization is increased. Therefore, it is preferable to use the chip type nitrocellulose obtained by substituting isopropyl alcohol in nitrocellulose with a vinyl chloride-vinyl acetate copolymer for example, substituting isopropyl alcohol of H-½ (Asahi Kasei Co.) with a vinyl chloride-vinyl acetate copolymer. The vinyl chloride-vinyl acetate type copolymer resins can be obtained by a copolymerization of vinyl chloride and vinyl acetate if necessary a small amount of a comonomer and if necessary a partial hydrolysis of vinyl acetate component to convert into vinyl alcohol component.

In the present invention, the three components are combined at specific ratios which are defined in the triangular coordinate of the three components as the hatched region of FIG. 1 that is, the range of 15 to 45 wt. % of the polyester resin, 20 to 50 wt. % of the epoxy resin and 10 to 40 wt. % of the nitrocellulose.

When the content of the polyester resin is less than 15 wt. %, the repeat running durability is not satisfactory whereas when it is more than 45 wt. %, the adhesive strength is improved but the tacky phenomenon is caused in a thermosetting step and the dispersibility of the magnetic powder composition is inferior to prevent an improvement of a surface property of a magnetic layer, and an electromagnetic transfer characteristic is inferior.

When the content of the epoxy resin is less than 20 wt. %, the surface property of the magnetic layer and the adhesive strength are inferior whereas when it is more than 50 wt. %, the friction is too high and the repeat running durability is remarkably inferior at high temperature.

When the content of nitrocellulose is less than 10 wt. %, the adhesive strength is improved but a dispersibility of the magnetic powder composition is inferior and the surface property of the magnetic layer is not improved and the electromagnetic transfer characteristic is inferior, whereas when it is more than 40 wt. %, the adhesive strength is inferior and a curl is caused to be difficult to practically use the product because of large difference of contraction coefficients of the substrate and the coated magnetic layer though the repeat running durability is superior.

The magnetic powder composition is prepared by using the resins as the binder and a solvent and dispersing a magnetic powder with a dispersing agent, a lubricant and other additives and adding a crosslinking agent such as a polyisocyanate with stirring. The magnetic powder composition is coated on a substrate such as a polyester film to form a magnetic layer having a desired thickness such as about 6μ. When the content of the crosslinking agent is less than 5 wt. %, the crosslinking effect is not enough whereas when it is more than 20 wt. %, the adhesive strength to the base film is inferior and the magnetic layer is brittle. Therefore, the content of the crosslinking agent is preferably in a range of 5 to 20 wt. % based on the total amounts of the resins.

The resulting magnetic recording medium has excellent electromagnetic transfer characteristic and excellent physical characteristics such as repeat running durability and adhesive strength.

The kinds of the magnetic powder the solvent and the additives and the preparation of the magnetic layers and the conditions well-known in this field and accordingly, they are not repeated in this specification.

The present invention will be illustrated by certain examples and references which are provided for purposes of illustration only and are not intended to be limiting the invention.

EXAMPLE 1

| | |
|---|---|
| Co-adsorbed $\gamma$-$Fe_2O_3$: | 400 wt. parts |
| Dispersing agent (Lecithin): | 8 wt. parts |
| Polyester resin (Nippolan 1004 manufactured by Nippon Polyurethan Co.): | 30 wt. parts |
| Epoxy resin (Epicoat 1007 manufactured by Shell Chemical Co.): | 40 wt. parts |
| Nitrocellulose (H-½ sec manufactured by Asahi Kasei Co.): | 30 wt. parts |
| Lubricant: | 5 wt. parts |
| Methyl ethyl ketone: | 400 wt. parts |
| Methyl isobutyl ketone: | 200 wt. parts |
| Cyclohexanone: | 150 wt. parts |

The components were thoroughly mixed by a disperser for paint, and polyisocyanate (Colonate L manufactured by Nippon Polyurethane Co.) was incorporated at a ratio of 12 wt. % based on the total amounts of the resins and the mixture was stirred to be uniform to prepare a magnetic powder composition. The composition was coated in a thickness of 6μ on a polyethyleneterephthalate film having a thickness of 15μ. The surface of the coated layer was processed by a super calender treatment and cured by heating it at about 60° C. for 40 hours. The product was cut in a width of 12.7 mm to prepare each magnetic recording tape (Sample 1).

EXAMPLE 2

In accordance with the process of Example 1 except varying ratios of components of the polyester resin, the epoxy resin and the nitrocellulose, in the range shown by shading in the triangular coordinate graph, video magnetic recording tapes (Samples 2 to 4) were prepared.

EXAMPLE 3

In accordance with the process of Example 1 except using a nitrocellulose resin obtained by substituting isopropyl alcohol in nitrocellulose H-½ with a vinyl chloride-vinyl acetate copolymer, a magnetic recording tape (Sample 5) was prepared.

Each adhesive strength, each repeat running durability, each electromagnetic transfer characteristic and each surface gloss of each of the magnetic recording tapes (Samples 1 to 5) were measured. The results are shown in Table.

As Reference A, a three component binder out of the shading range was used to prepare a magnetic recording tape. As References B to E, each two component binder was used to prepare each magnetic recording tape.

TABLE

| Sample | 1 | 2 | 3 | 4 | 5 |
|---|---|---|---|---|---|
| Binder: | | | | | |
| Polyester resin | 30 | 40 | 25 | 40 | 30 |
| Epoxy resin | 40 | 30 | 40 | 40 | 40 |
| Nitrocellulose | 30 | 30 | 35 | 20 | 30 |
| Characteristics: | | | | | |
| Adhesive strength (g) | 65 | 60 | 55 | 70 | 75 |
| Repeat running durability (time) | 750 | 850 | 1050 | 900 | 1350 |
| Electromagnetic transfer charac- | 0 | +0.5 | +0.1 | 0 | +0.2 |

TABLE -continued

| Sample | 1 | 2 | 3 | 4 | 5 |
|---|---|---|---|---|---|
| teristic 5 KHz (dB) | | | | | |
| Gloss degree (dB) | 0 | +0.1 | −0.2 | +0.2 | +0.4 |

TABLE'

| Sample | A | B | C | D | E |
|---|---|---|---|---|---|
| Binder: | | | | | |
| Polyester resin | 45 | 65 | 35 | 70 | 25 |
| Epoxy resin | 50 | 35 | 65 | — | — |
| Nitrocellulose | 5 | — | — | 30 | 75 |
| Characteristics: | | | | | |
| Adhesive strength (g) | 110 | 130 | 80 | 50 | 15 |
| Repeat running durability (time) | 300 | 200 | 250 | 400 | 800 |
| Electromagnetic transfer characteristic 5 KHz (dB) | +0.3 | −1.0 | −0.5 | 0 | −0.8 |
| Gloss degree (dB) | +0.5 | −1.0 | −0.8 | +0.1 | −1.2 |

The adhesive strength was measured by peeling strength between the magnetic layer and the base film in the direction of 180 degree and was shown by unit of gram per ⅛ inch of a width.

The electromagnetic transfer characteristic is shown by a relative value to that of the magnetic recording tape of Example 1 (Sample 1) as 0 dB.

The gloss degree (measured by a gloss meter GM-3D manufactured by Murakami Shikisai Co.) is also shown by a relative value to that of (Sample 1) as 0 dB.

As it is clearly found in Table, the magnetic recording media (Samples 1 to 5) prepared by using each three component binder having ratios of the components in the shading range had excellent adhesive strength, repeat running durability, electromagnetic transfer characteristic and gloss degree. The product prepared by using the vinyl chloride-vinyl acetate copolymer substituted nitrocellulose had especially superior characteristics.

As described above, the magnetic recording media of the present invention have balanced characteristics in total and impart further superior characteristics.

We claim:

1. In a magnetic recording medium having a substrate coated with a magnetic layer comprising a magnetic powder and a binder, the improvement characterized in that said binder in said magnetic layer consist essentially of 15 to 45 wt. % of a polyester resin, 20 to 50 wt. % of an epoxy resin and 10 to 40 wt. % of nitrocellulose.

2. The magnetic recording medium according to claim 1 wherein a crosslinking agent is incorporated in a range of 5 to 20 wt. % based on the total amounts of said resins.

3. The magnetic recording medium according to claim 2 wherein said crosslinking agent is a polyisocyanate.

4. The magnetic recording medium according to claim 1 wherein said magnetic recording medium is a magnetic recording tape or sheet.

5. The magnetic recording medium according to claim 1 wherein said nitrocellulose is free of isopropyl alcohol and contains vinyl chloride-vinyl acetate copolymer.

* * * * *